US009828505B2

(12) United States Patent
Corcoran et al.

(10) Patent No.: US 9,828,505 B2
(45) Date of Patent: Nov. 28, 2017

(54) POLYMER ASPHALT-RUBBER

(71) Applicant: Manhole Adjusting, Inc., Pico Rivera, CA (US)

(72) Inventors: John Corcoran, Los Angeles, CA (US); Hussain Bahia, Madison, WI (US)

(73) Assignee: Manhole Adjusting, Inc., Pico Rivera, CA (US)

( * ) Notice: Subject to any disclaimer, the term of this patent is extended or adjusted under 35 U.S.C. 154(b) by 93 days.

(21) Appl. No.: 13/730,769

(22) Filed: Dec. 28, 2012

(65) Prior Publication Data

US 2013/0172452 A1    Jul. 4, 2013

Related U.S. Application Data

(60) Provisional application No. 61/582,219, filed on Dec. 30, 2011.

(51) Int. Cl.
*C08L 95/00* (2006.01)
*C09D 195/00* (2006.01)
*E01C 7/35* (2006.01)

(52) U.S. Cl.
CPC .......... *C08L 95/00* (2013.01); *C09D 195/00* (2013.01); *C08L 2555/34* (2013.01); *C08L 2555/86* (2013.01); *E01C 7/358* (2013.01)

(58) Field of Classification Search
CPC ...................................................... C08L 95/00
USPC ...................................................... 524/68
See application file for complete search history.

(56) References Cited

U.S. PATENT DOCUMENTS

| | | | |
|---|---|---|---|
| 3,891,585 A | 6/1975 | McDonald | |
| 4,069,182 A | 1/1978 | McDonald | |
| 4,166,049 A | 8/1979 | Huff | |
| 7,033,104 B2* | 4/2006 | Corcoran | E01C 23/14 404/77 |
| 7,144,933 B2* | 12/2006 | Stuart et al. | 524/68 |
| 2010/0168274 A1* | 7/2010 | Coe | C08L 95/005 523/204 |
| 2012/0196959 A1* | 8/2012 | Rotz et al. | 524/59 |

OTHER PUBLICATIONS

Honeywell Titan 7686 MSDS obtained Aug. 6, 2014 at http://msds-resource.honeywell.com.*
Epolene E-20 Polymer Product Data Sheet obtained Aug. 6, 2014 at http://www.westlake.com/_filelib/FileCabinet/Epolene/MSDS/Epolene-TDS_E-20.pdf.*
ASTM D8-02 Standard Terminology Relating to Materials for Roads and Pavements. Obtained Dec. 16, 2014 at http://www.scribd.com/doc/176866594/ASTM-D-8-02-Standard-Terminology-Relating-to-Materials-for-Roads-and-Pavements.*
The University of Wisconsin White Paper on "The Effects of Digesting Crumb Rubber in Modified Binders", Feb. 2011, By The University of Wisconsin-Madison Asphalt Research Group in Collaboration with the Recycled Materials Resource Center, pp. 1-14.*

(Continued)

*Primary Examiner* — Lanee Reuther
(74) *Attorney, Agent, or Firm* — Lewis Roca Rothgerber Christie LLP

(57) ABSTRACT

Embodiments of the present invention are directed to compositions and methods for a thermoplastic paving composition including an asphalt rubber binder and a polyethylene polymer additive.

16 Claims, 3 Drawing Sheets

(56) References Cited

OTHER PUBLICATIONS

Public Works Standards, Inc.; "Greenbook" Standard Specifications for Public Works Construction; 2009 Edition; 15pp.
The Department of Transportation for the State of California ("Caltrans"); "10-1. Asphalt-Rubber Seal Coat"; XE 37-030 E A06-05-09; Jun. 5, 2009; pp. 1-16.
American Society for Testing and Materials International (ASTM); "Standard Terminology Relating to Materials for Roads and Pavements"; D 8-02; 2002; 4pp.
American Society for Testing and Materials International (ASTM); "Standard Specification for Asphalt-Rubber Binder"; D 6114/D 6114M-09; 2009; 4pp.
Asphalt Institute; "Superpave: Performance Graded Asphalt Binder Specification and Testing: Superpave Series No. 1", ISBN-13HONEYWELL: 9781934154168; 2001; 39pp.
Honeywell; "Oxidized Polyethylene, Product Stewardship Summary"; Feb. 2011; 1pg.
Honeywell; "Material Safety Data Sheet, Oxidized Polyethylene Homopolymers"; MSDS No. ACP0110; Mar. 2009; 8pp.
Hanz, Andrew et al.; "Impacts of WMA Production Temperatures on Binder Aging and Mixture Flow Number"; Journal of the Association of Asphalt Paving Technologies; vol. 80; 2011; 26pp.
Declaration of John Corcoran, pertaining to U.S. Appl. No. 13/730,769; Declaration dated Aug. 28, 2015; 4 pages.
Becker, Yvonne et al.; "Polymer Modified Asphalt"; Vision Technologica; vol. 9; No. 1; 2001; pp. 39-50.

\* cited by examiner

POLYMER ASPHALT-RUBBER

CROSS-REFERENCE TO RELATED APPLICATION(S)

The present application claims priority to and the benefit of U.S. Provisional Application Ser. No. 61/582,219 filed on Dec. 30, 2011, the entire contents of which are incorporated herein by reference.

FIELD

The present invention is directed to an asphalt composition including a thermoplastic asphalt-rubber paving material with a polyethylene polymer that increases the softening point temperature of the asphalt composition.

INTRODUCTION

Asphalt-rubber binder includes at least asphalt paving oil mixed with recycled rubber. The specifications for asphalt-rubber binder can vary, and may be required to vary, depending on the climate and pavement temperature conditions where the paving of the asphalt-rubber binder is applied. That is, in warmer climate regions, the asphalt-rubber binder preferably has a softening point temperature that is higher than the highest surface temperature encountered in that region. When the softening point of the asphalt-rubber binder is reached or exceeded, most especially, for example, in stopping point areas, high torque areas (e.g., cul-de-sacs and mountain roads), and heavy arterial street traffic areas having high stop frequency, the pavement is more likely to bleed (i.e., oil is squeezed from asphalt, also referred to as flushing in which the oils migrate to the top surface) causing the pavement to be compromised.

SUMMARY

In some embodiments of the present invention, a thermoplastic paving composition is provided including an asphalt-rubber binder and a polyethylene polymer additive.

In some embodiments, the polyethylene polymer additive of the composition is oxidized polyethylene. In some embodiments, the oxidized polyethylene has a melting point temperature from about 88° C. to about 140° C. In other embodiments, the oxidized polyethylene has a melting point temperature of about 100° C. to about 140° C.

In some embodiments, the polyethylene polymer additive is present in an amount of about 1% to about 4% by weight of the asphalt-rubber binder alone. In other embodiments, the polyethylene polymer additive is present in an amount of about 2% to about 4% by weight of the asphalt-rubber binder alone. In still other embodiments, the polyolefin polymer additive is present in an amount of about 3% by weight of the asphalt-rubber binder alone.

In some embodiments, the asphalt-rubber binder is asphalt-rubber seal coat.

In some embodiments, the thermoplastic paving composition of the present invention has a performance grade (PG) rating of PG 88. In other embodiments, the thermoplastic paving composition of the present invention is PG 94.

In some embodiments, the thermoplastic paving composition of the present invention has a softening point temperature of about 100° C. In other embodiments, the thermoplastic paving composition of the present invention has a softening point temperature of about 81° C.

In some embodiments, a method of increasing the softening point temperature of asphalt-rubber paving binder is provided, the method including preparing a thermoplastic paving composition by mixing a polyethylene polymer additive with an asphalt-rubber binder. An amount of the polyethylene polymer additive may be about 1 to about 4% by weight of the asphalt-rubber binder alone.

In some embodiments of the method, the polyethylene polymer additive is used in an amount of about 2% to about 4% by weight of the asphalt-rubber binder alone. In other embodiments, the polyethylene polymer additive is used in an amount of about 3% by weight of the asphalt-rubber binder alone.

In some embodiments of the method, the polyethylene polymer is oxidized polyethylene.

In other embodiments, the softening point temperature of the thermoplastic paving composition is about 85° C. In other embodiments, the softening point temperature of the thermoplastic paving composition is about 81° C.

In some embodiments of the method of the present invention, the asphalt-rubber binder is utilized in an asphalt-rubber seal coat.

DETAILED DESCRIPTION

Figure 1A:
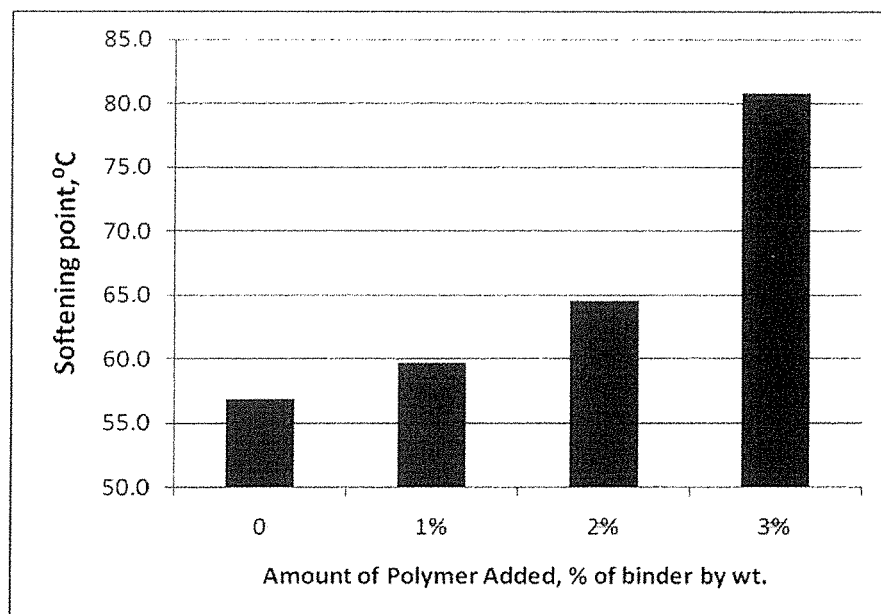
FIG. 1A is a graph of the softening point temperature of the paving compositions of Example 1 as a function of the amount of polyethylene polymer additive, according to embodiments of the present invention.

In some embodiments of the present invention, a thermoplastic asphalt-rubber paving composition includes an asphalt rubber material, and a polyethylene polymer additive. As used herein, asphalt-rubber paving material, asphalt-rubber paving binder, asphalt-rubber material, and asphalt-rubber binder are used interchangeably, and refer to an asphalt paving oil mixed with recycled rubber and other components (e.g. asphalt modifier). As used herein, additive refers to a component that makes no more than 10% of a composition.

In some embodiments of the present invention, the polyethylene polymer additive increases the softening point temperature of the thermoplastic paving composition. In some embodiments, the polyethylene polymer additive in a thermoplastic paving composition does not degrade. For example, over time, the presently disclosed polyethylene polymer is not susceptible to ultraviolet degradation (i.e., caused by sunlight) in the paving composition, and therefore maintains its effect (e.g. increasing the softening point temperature) in the paving composition. In this way, the disclosed polyethylene polymer is different from other polymers used in thermoplastic paving compositions. Moreover, the presently disclosed polyethylene polymer is less susceptible to cracking at lower temperatures (e.g., temperatures below 60° F., and temperatures below 50° F.), as compared to other polymers (e.g., styrene butadiene styrene (SBS) and styrene ethylene styrene (SEBS)). That is, the polyethylene polymer is less likely to cause cracking of the asphalt rubber binder at lower temperatures, as compared to other polymer additives at lower temperatures. In this way, the paving composition having the disclosed polyethylene polymer has aggregate retention at lower temperatures while maintaining its higher softening point temperature.

In some embodiments, the polymer is oxidized polyethylene (i.e., 6-hydroxy-5-methyl-4,11-dioxoundecanoic acid), mixed with asphalt-rubber paving material in an amount of about 1% to up to no more than about 10% by weight of the asphalt-rubber paving material alone. In other embodiments the polyethylene is provided in an amount of about 1% to about 4% by weight of the asphalt-rubber material alone. In other embodiments the polyethylene is provided in an amount of about 2% to about 3% by weight of the asphalt-rubber material alone. In still other embodiments, the polyethylene is provided in an amount of about 3% by weight of the asphalt-rubber paving material alone.

In some embodiments, the polyolefin polymer is an oxidized polyethylene polymer (i.e., 6-hydroxy-5-methyl-4,11-dioxoundecanoic acid). In some embodiments, the polyethylene polymer has a melting point temperature of about 88° to about 140° C. In other embodiments, the polyethylene polymer has a melting point temperature of about 100° C. to about 140° C.

In some embodiments, the asphalt-rubber paving material includes an asphalt paving oil mixed with recycled rubber. This mixture is a preferred paving material because of its superior physical properties and its potential as a solution to the disposal of scrap automobile and truck tires which is a major environmental problem. A popular process for the production of such material (i.e., the mixture of asphalt paving oil and recycled rubber) is described in U.S. Pat. Nos. 3,891,585 and 4,069,182, both issued to Charles H. McDonald; and U.S. Pat. No. 4,166,049 issued to Bobby J. Huff, the entire contents of all of which are hereby incorporated by reference. According to one form of this process, recycled crumb rubber obtained from scrap tires is mixed with paving grade liquid asphalt (usually paving grade (PG) 58-22, 64-16, 64-22, and/or 70-10) to form a jellied composition of "asphalt-rubber".

In some embodiments, the mixing and processing of the asphalt-rubber paving material of the present invention may be performed in accordance with many available standards related to asphalt rubber paving material. For example, the asphalt-rubber paving material may be prepared in accordance with the standards disclosed in one of the following, or a combination of the following: i) the Greenbook, 2009, Section 203-11.2.3; ii) the Department of Transportation for the State of California ("Caltrans"), as described in XE 37-030 E A06-05-09, pages 1-16; iii) American Society for Testing and Materials (ASTM) D 8-02 Standard Definitions of Terms Relating to Materials for Roads and Pavements; and iv) ASTM D 6114/D 6114M-09.

As used herein, crumb rubber modifier (CRM) is defined as a combination of scrap tire CRM and high natural CRM as described in Greenbook, 2009, Section 203-11.2.3. In some embodiments of the present invention, thermoplastic paving material includes the asphalt-rubber binder as defined in the Greenbook 2009, Section 203-11.4 where the "total weight of asphalt-rubber binder, is about 80 percent±2 percent combined paving asphalt and asphalt modifier, and 20 percent±2 percent CRM. However, the minimum amount of CRM is not less than about 18 percent."

In some embodiments, the asphalt-rubber binder of the present invention is defined and/or mixed and processed as specified by Caltrans, (e.g., XE 37-030 E A06-05-09, pages 1-16).

In some embodiments of the present invention, the thermoplastic paving material includes asphalt-rubber as defined in ASTM D 8-02 Standard Definitions of Terms Relating to Materials for Roads and Pavements. That is, the asphalt-rubber is "a blend of asphalt cement, reclaimed tire rubber, and certain additives in which the rubber component is at least 15% by weight of the total blend and has reacted in the hot asphalt cement sufficiently to cause swelling of the rubber particles."

The asphalt-rubber paving material of the present invention can be used in the making of asphalt-rubber seal coat, which is also referred to as asphalt-rubber chip seal, asphalt-rubber and aggregate membrane (ARAM) (see, e.g. Corcoran, U.S. Pat. No. 7,033,104) to refer to a layer of aggregate which is coated over and covers an applied thermoplastic material prior to applying heat and pressure to partially embed the aggregate into the thermoplastic material. The asphalt-rubber paving material of the present invention can also be used in the making of stress absorbing membrane (SAM), which refers to the combination of one or more layers of asphalt with one or more layers of fine aggregate. The asphalt-rubber paving material can also be used in preparing stress absorbing membrane interlayer (SAMI), also known simply as "interlayer" which refers to a combination (mixture) of polymerized asphalt rubber and sized crushed aggregate.

In some embodiments of the present invention, addition of a polyethylene polymer to an asphalt rubber paving material enables the softening point temperature of the asphalt-rubber paving material and polymer composition to reach about 85° C.

In other embodiments, the softening point temperature of the asphalt-rubber paving material and polymer composition is about 165° F. (73.9° C., or up to about 75° C.), which is the maximum for asphalt-rubber binder as specified in Table 203-11.4 (A) of the Greenbook, 2009. Using the data provided in present disclosure, the polyethylene polymer can be added to the asphalt-rubber paving material and composition to arrive at any softening point temperature up to and including 85° C. In accordance with the Greenbook, 2009, the softening point temperature of the asphalt-rubber binder is measured by the method as set forth in ASTM D 36. In other embodiments, the softening point temperature is measured using any suitable method.

In some embodiments, the asphalt-rubber binder includes a polyolefin polymer such that the product composition has the physical requirements for asphalt-rubber binder modified from ASTM D 6114/D 6114M-09.

In some embodiments of the present invention, a thermoplastic composition includes asphalt rubber binder and a polyethylene polymer additive, which composition has an increased PG grade compared to asphalt rubber binder without a polyethylene additive. For example, in the current PG grading system, it is required that a binder of a certain PG grade (for example, PG 76) should have a minimum G*/sin δ value of 1.0. This minimum limit is expected to ensure acceptable contribution of binder to rutting resistance in a climate where maximum pavement design temperature will not exceed 75 degrees Celsius (° C.). The maximum pavement design temperature is the 7-day average of the hottest week of the year. (See, for example, Superpave Series No. 1 SP1, the Asphalt Institute Item Code: Sp1, Part No. SP1, ISBN: 9781934154168, the entire contents of which are incorporated by reference.)

Asphalt-rubber and aggregate membrane (ARAM) as disclosed herein, having 2%, 3% and 4% oxidized polyethylene polymer by weight of the ARAM alone, has been applied to several public roads with favorable results. Other asphalt-rubber binders having an oxidized polyethylene polymer are expected to perform with similar results.

The following Examples are presented for illustrative purposes only, and do not limit the scope or content of the present application.

EXAMPLE 1

Asphalt-Rubber Binder with 1-4% Oxidized Polyethylene

The thermoplastic paving material used in this example was an asphalt-rubber binder (Neat asphalt from Manhole Adjusting, Inc.) mixed with 0, 1, 2, 3, and 4% by weight oxidized polyethylene polymer (CAS No. 68441-17-8) (6-hydroxy-5-methyl1-4,11-dioxoundecanoic acid; oxidized polyethylene homopolymer) (Honeywell International, Inc., New Jersey). The mixing was done by heating the asphalt-rubber in a one quart container (about 1000 grams) to 145-150° C. for sufficient time to stabilize at that temperature. The oxidized polyethylene polymer (in a ratio of 1, 2, 3, and 4 polymer units to 100 units of asphalt rubber binder) was added manually into the heated asphalt-rubber sample while being stirred with a low-shear paddle mixer. The mixing continued for 60 minutes at 150-155° C.

Figure 1B:
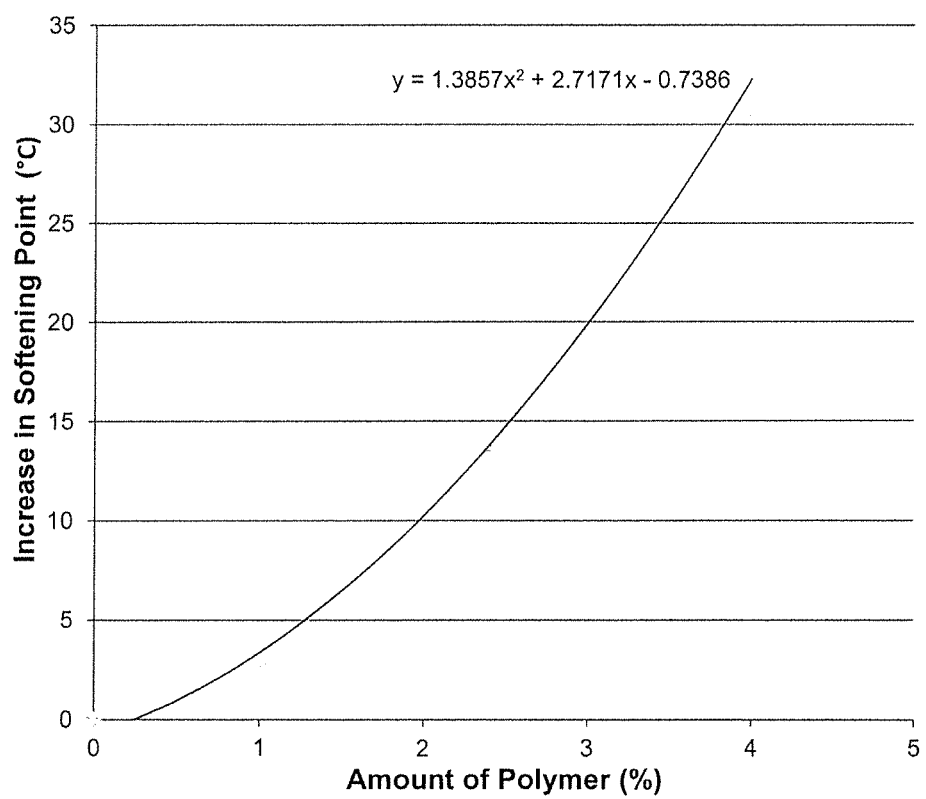
FIG. 1B is a graph of the increase in the softening point temperature of the paving composition of Example 1, as a function of the amount of polyethylene polymer, according to embodiments of the present invention.

The softening point temperatures were measured according to ASTM D36, and the results are shown below in Tables 1 and FIGS. 1A and 1B. The data in Table 1 and FIG. 1A show that 1%, 2%, 3%, and 4% polyethylene polymer increase the softening point temperature of the asphalt-rubber binder. For example, Table 1 shows that 3% polyethylene polymer increases the softening point temperature up to about 81° C. and 4% polyethylene polymer increases the softening point temperature up to about 85° C. FIG. 1B shows the respective amount of increase in the softening point temperature for 1, 2, 3, and 4% polyethylene polymer.

TABLE 1

Softening Pt. Temperature for 0-4% polyethylene polymer.

| % of Polymer | Softening Point, C. | Increase in Softening Point, C. |
|---|---|---|
| 0 | 56.9 | 0 |
| 1 | 59.7 | 2.8 |
| 2 | 64.6 | 7.7 |
| 3 | 80.9 | 24.0 |
| 4 | 84.5 | 30.7 |

EXAMPLE 2

Changes in G*/Sin δ Values

Figure 2:
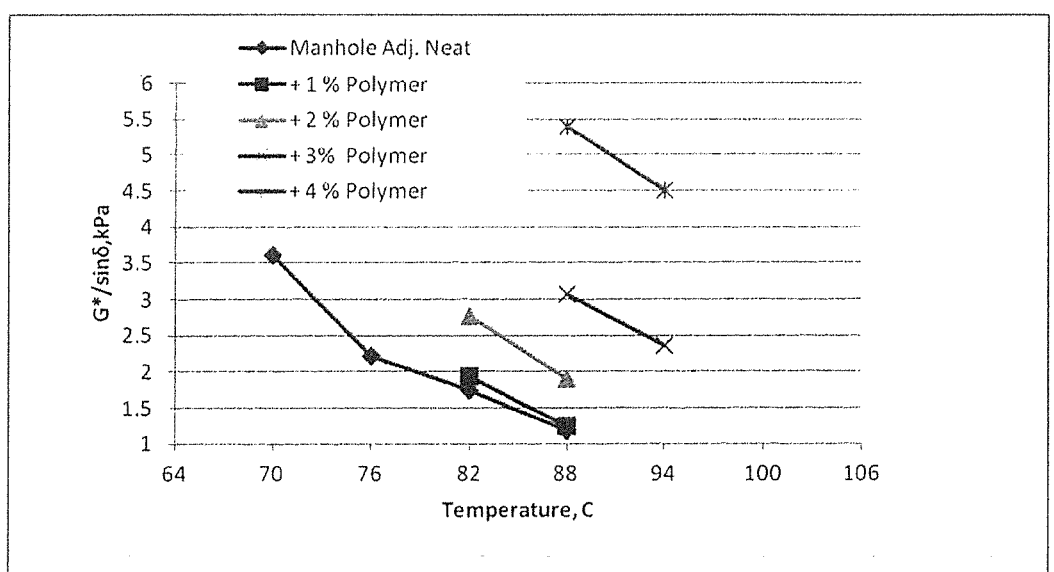
FIG. 2 is a graph of the high temperature rutting resistance (represented as G*/sin δ, kPa, and measured using a Dynamic Shear Rheometer (DSR)), of the compositions of Example 1 as a function of temperature, according to embodiments of the present invention.

A dynamic shear rheometer (DSR) was used to test the asphalt-rubber binders of Example 1 with 0, 1, 2, 3, and 4% oxidized polyethylene. Using a 2-mm plate test geometry, changes in G*/sin δ were measured. This rheological measurement is used in the PG grading system as a measure of high temperature rutting resistance. FIG. 2 shows the measured values of G*/sin δ. The required limit in the PG grading is 1.0 KPa. As shown in FIG. 2, the addition of 2% oxidized polyethylene changes the PG grade by one step (i.e., 6° C.). Table 2, below, shows the results for AR (Asphalt Rubber) with 3% and 4% oxidized polyethylene (e.g., ON Titan 7686 ("7686")).

TABLE 2

| | Test Temp ° C. | AR | AR + 3% 7686 | AR + 4% 7686 |
|---|---|---|---|---|
| G*/sinδ, kPa | 88 | 1.47 | 3.07 | 5.39 |
| Unaged | 94 | 1.08 | 2.36 | 4.51 |

From the G*/sin δ measurement shown in FIG. 2 and Table 2, a PG grading for each sample was estimated by interpolating the data. For the asphalt-rubber binder without oxidized polyethylene polymer, the grade is PG 82. For asphalt-rubber binder including 2% oxidized polyethylene, the estimated grade is PG 88. For asphalt-rubber binder including 3% oxidized polyethylene, the estimated grade is PG 88, and for asphalt rubber binder including 4% oxidized polyethylene, the estimated grade is PG 94.

EXAMPLE 3

Measured Viscosity of Asphalt-Rubber with 2-4% Oxidized Polyethylene

Viscosity was measured in the asphalt-rubber binders prepared as described in Example 1, having no addition (i.e. "AR"), and asphalt-rubber binders with 2%, 3%, and 4% oxidized polyethylene polymer (CAS No. 68441-17-8, available from Honeywell). As shown in Table 3, the viscosity was measured by the Brookfield method, the VT-04F direct measurement method, and the VT-04F Greenbook method.

TABLE 3

Viscosity of Asphalt Rubber with 2-4% Oxidized Polyethylene****

| | AR (no additive) | | | 2% Polyethylene | | | 3% Polyethylene | | | 4% Polyethylene | | |
|---|---|---|---|---|---|---|---|---|---|---|---|---|
| Speed (RPM) | Viscosity Brookfield (cP) | VT04F direct (P) | VT-04 Greenbook Method (cP) | Viscosity Brookfield (cP)* | VT04F direct (P)** | VT-04 Greenbook Method (cP) | Viscosity Brookfield (cP) | VT04F direct (P) | VT04 Greenbook Method (cP) | Viscosity Brookfield (cP) | VT04F direct (P) | VT04 Greenbook Method (cP) |
| 10.0 | 3340.0 | | | 1950.0 | | | 3066.67 | | | 3514.17 | | |
| 20.0 | 2506.67 | | | 1503.75 | | | 2414.17 | | | 2308.33 | | |
| 30.0 | 2206.94 | | | 1268.33 | | | 2110.00 | | | 1883.89 | | |
| 40.0 | 1994.38 | | | 1124.06 | | | 1966.25 | | | 1698.75 | | |
| 50.0 | 1860.50 | | | 1061.75 | | | 1851.33 | | | 1616.83 | | |

TABLE 3-continued

Viscosity of Asphalt Rubber with 2-4% Oxidized Polyethylene****

| | AR (no additive) | | | 2% Polyethylene | | | 3% Polyethylene | | | 4% Polyethylene | | |
|---|---|---|---|---|---|---|---|---|---|---|---|---|
| Speed (RPM) | Viscosity Brookfield (cP) | VT04F direct (P) | VT-04 Greenbook Method (cP) | Viscosity Brookfield (cP)* | VT04F direct (P)** | VT-04 Greenbook Method (cP) | Viscosity Brookfield (cP) | VT04F direct (P) | VT04 Greenbook Method (cP) | Viscosity Brookfield (cP) | VT04F direct (P) | VT04 Greenbook Method (cP) |
| 60.0 | 1763.47 | | | 1006.46 | | | 1766.11 | | | 1543.47 | | |
| 62.5 | 1750.00 | 16.33 | 1533.33 | 998.20 | 8.93*** | 793.33 | 1764.80 | 16.17 | 1516.67 | 1503.87 | 14.17 | 1316.67 |

*cP = centiPoise;
**P = Poise;
***VT-04F direct measurements: 1 = 100 cP;
****CAS No. 68441-17-8

As observed from the increased softening point temperatures in Table 1, FIGS. 1A and 1B, the rheological G*/sin δ measurements as shown in FIG. 2, and the viscosity in Table 3, the addition of oxidized polyethylene improves the utility of the asphalt-rubber binder composition in warmer climates.

While the present invention has been illustrated and described with reference to certain exemplary embodiments, those of ordinary skill in the art will understand that various modifications and changes may be made to the described embodiments without departing from the spirit and scope of the present invention, as defined in the following claims.

What is claimed is:

1. A seal coat paving composition, comprising:
 a seal coat binder composition layer, comprising:
  an asphalt-rubber binder as defined in ASTM D8-02, the asphalt-rubber binder comprising a blend of asphalt cement and tire rubber, in which the tire rubber is at least 15% by weight of the blend and has reacted in the asphalt cement sufficiently to cause swelling of the tire rubber; and
  a polyethylene polymer additive; and
 a layer of aggregate coating the seal coat binder composition layer.

2. The seal coat paving composition of claim 1, wherein the polyethylene polymer additive is present in an amount of about 1% to about 4% by weight of the asphalt-rubber binder.

3. The seal coat paving composition of claim 1, wherein the polyethylene polymer additive is present in an amount of about 2% to about 4% by weight of the asphalt-rubber binder.

4. The seal coat binder composition of claim 1, wherein the polyethylene polymer additive is present in an amount of about 3% by weight of the asphalt-rubber binder.

5. The seal coat paving composition of claim 1, wherein the polyethylene polymer additive is an oxidized polyethylene homopolymer.

6. The seal coat paving composition of claim 1, wherein the polyethylene polymer additive has a melting point of about 88° C. to about 140° C.

7. The seal coat paving composition of claim 1, wherein the polyethylene polymer additive is an oxidized polyethylene homopolymer having a melting point of about 100° C. to about 140° C.

8. The seal coat paving composition of claim 1, wherein the seal coat paving composition has a performance grade (PG) rating of 88.

9. The seal coat paving composition of claim 1, wherein the seal paving composition has a performance grade (PG) rating of 94.

10. A method of increasing the softening point temperature of a seal coat binder composition layer, comprising
 mixing a polyethylene polymer additive with an asphalt-rubber binder as defined in ASTM D 8-02, the asphalt-rubber binder comprising a blend of asphalt cement and tire rubber, in which the tire rubber is at least 15% by weight of the blend and has react in the asphalt cement sufficiently to cause swelling of the tire rubber, the polyethylene polymer being in an amount of about 1 to 4% by weight of the asphalt-rubber binder, wherein the seal coat binder composition layer has a softening point temperature of about 59.7° to about 85° Celsius.

11. The method of claim 10, wherein the mixing the polyethylene polymer additive with the asphalt-rubber binder comprises mixing the polyethylene polymer additive in an amount of about 2% to about 4% by weight of the asphalt-rubber binder.

12. The method of claim 10, wherein the mixing the polyethylene polymer additive with the asphalt-rubber binder comprises mixing the polyethylene polymer additive in an amount of about 3% by weight of the asphalt-rubber binder.

13. The method of claim 10, wherein the softening point temperature of the seal coat binder composition layer is about 85° C.

14. The method of claim 10, wherein the softening point temperature of the seal coat binder composition layer is about 81° C.

15. The method of claim 10, wherein the polyethylene polymer additive has a melting point of about 88° C. to about 140° C.

16. The method of claim 10, wherein the polyethylene polymer additive has a melting point of about 100° C. to about 140° C.

* * * * *